June 26, 1923.  
J. W. DAVIS  
WINDSHIELD VISOR  
Filed April 27, 1921  
1,460,313  
2 Sheets-Sheet 1

INVENTOR.  
John W. Davis.  
BY  
ATTORNEYS.

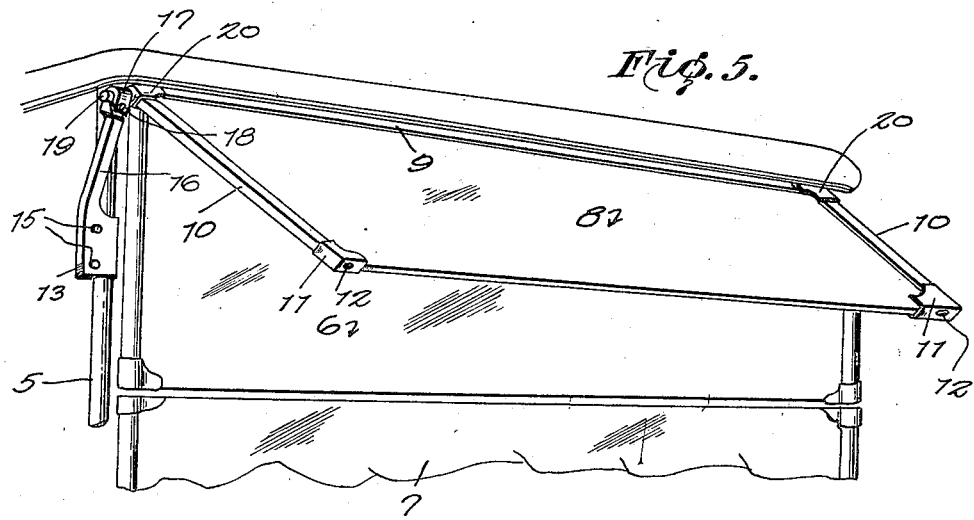
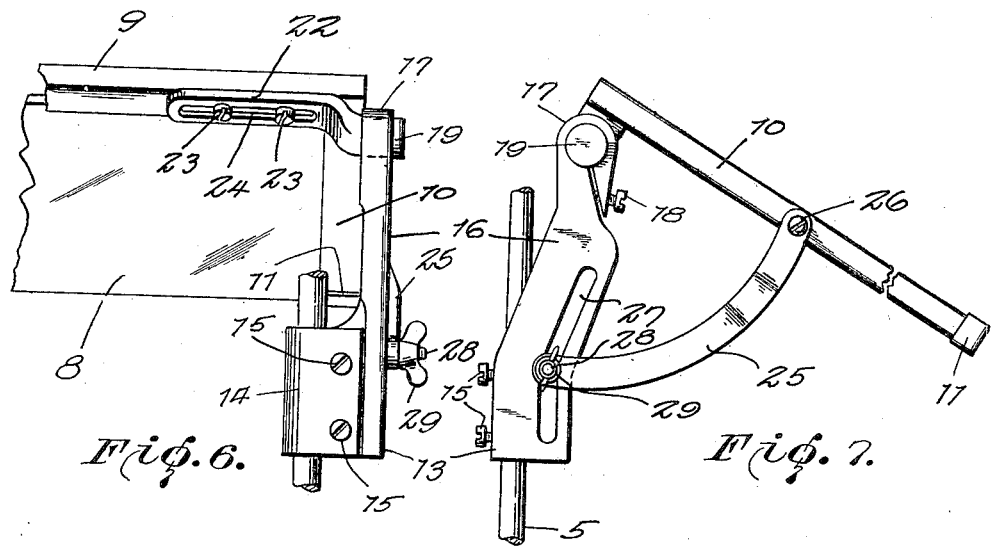

Patented June 26, 1923.

1,460,313

UNITED STATES PATENT OFFICE.

JOHN WATTERSON DAVIS, OF DALLAS, TEXAS.

WINDSHIELD VISOR.

Application filed April 27, 1921. Serial No. 464,968.

*To all whom it may concern:*

Be it known that I, JOHN WATTERSON DAVIS, a citizen of the United States, residing at Dallas, in the county of Dallas and State of Texas, have invented new and useful Improvements in Windshield Visors, of which the following is a specification.

This invention relates to visors employed in connection with motor vehicle windshields for shielding the driver's eyes from the glare of the sun, street lamps and headlights, and more particularly to a device of this kind in the form of a glass panel which is pivotally supported at the top of the windshield so that it may be readily adjusted to suit the driver.

The invention has for its object to provide a novel and improved supporting means for the visor by which the latter is held so that it does not interfere with the opening of the windshield, or the raising and the lowering of the top of the car.

The invention also has for its object to provide a visor mount which is simple and durable, and which enables the visor to be installed without alterations or changes in the structure of the windshield.

The objects stated are attained by means of a combination and arrangement of parts to be hereinafter described and claimed, and in order that the same may be better understood, reference is had to the accompanying drawing forming a part of this specification.

Fig. 5 is a perspective view of the visor in place;

Fig. 6 is a rear elevation showing a modified form of visor mount, and

Fig. 7 is a side elevation thereof.

Figure 1:
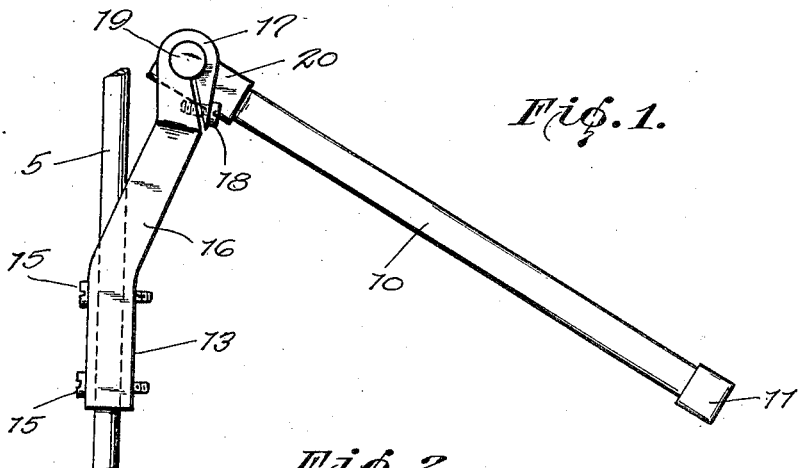
Fig. 1 is a side elevation of the visor and a fragment of a windshield frame showing the means for attaching the visor to said frame.
Figure 2:
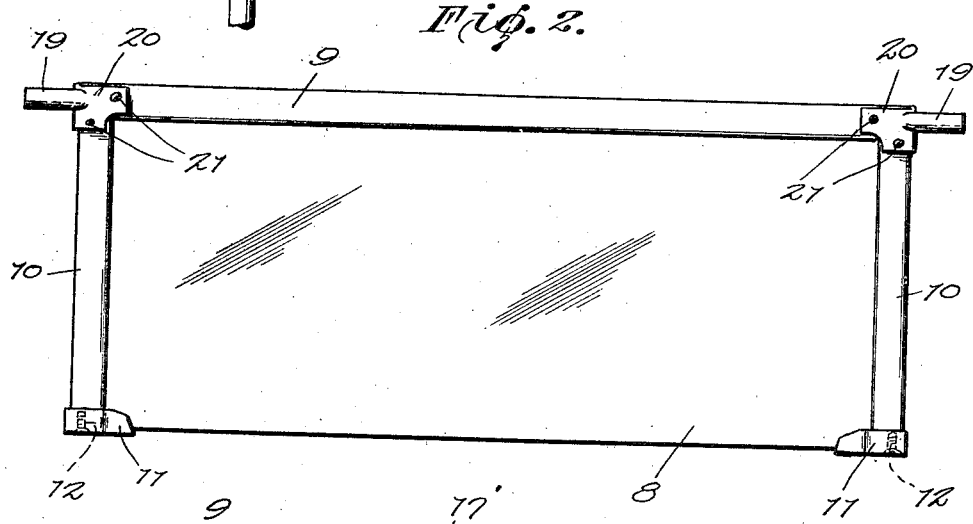
Fig. 2 is a plan view of the visor detached from the windshield frame.
Figure 3:
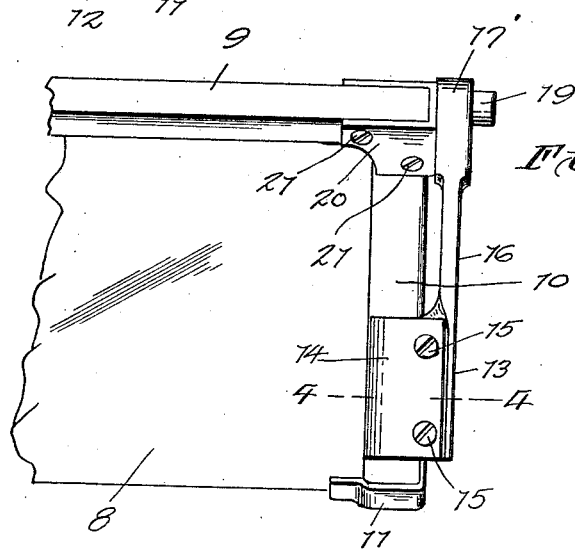
Fig. 3 is a rear elevation of one end of the visor and the attaching means at this end.
Figure 4:
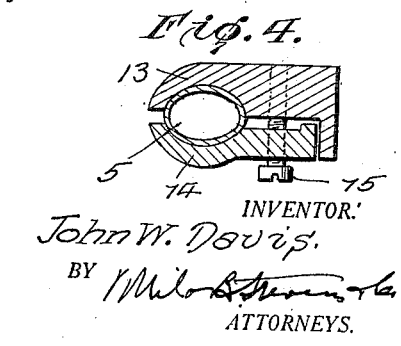
Fig. 4 is a cross section on the line 4—4 of Fig. 3.

Referring specifically to the drawing, 5 denotes the upright side bars of a motor vehicle windshield frame. The windshield consists of upper and lower glass panels 6 and 7 which are pivoted to the side bars in the usual manner so that they may be swung open or closed.

The visor is a glass panel 8 of substantially the same width as the windshield, and it is mounted in front of the top glass 6. The panel 8 is mounted in a frame composed of a top member 9, and side members 10, the glass being secured in this frame in the usual manner. The frame members may be ordinary windshield tubing. To the lower ends of the side members 10 are secured cast brass corner clips 11 engaging the bottom edge of the pane and assisting in holding the same in the frame. The clips 11 are fastened to the side members 10 by screws 12, and they are strong and durable and will not bend under severe use.

To each side bar 5 is secured a clamp composed of jaws 13 and 14 shaped to embrace the side bar, and to be drawn together to tightly grip the same, by screws 15. The jaw 13 has an upwardly projecting bracket arm 16 formed at its outer end with a bearing in the form of an eye 17 which is split and resilient so that it may be expanded and contracted by a screw 18.

At the top of the panel 8 are outstanding pivot studs 19 which seat in the eyes 17, by means of which the panel is pivotally supported so that it may be set at any desired angle with respect to the top windshield glass 6.

The pivot studs 19 are carried by corner pieces 20 secured to the frame member 9 of the panel 8 by screws 21. The pivot studs 19 are made long enough to permit longitudinal adjustment to adapt the device to windshields of different widths. The screws 18 will be set to obtain a degree of friction between the pivot studs 19 and the bearings 17 sufficient to hold the visor in any desired position to which it may be swung. The visor can therefore be readily raised and lowered at will by the driver without loosening, adjusting or locking nuts, screws, and the like, and this can be done without the driver leaving his seat or stopping the car. The visor can be pulled down right against the windshield, and when driving over hilly roads it can be pushed up as far as desired to give the driver clear vision when the car is going down grade. The ready adjustability of the visor also enables the driver to promptly set the same to stop the glare of approaching headlights.

The visor has a wide range of adjustment, being capable of a swing from depending to upstanding vertical position, and hence it can be set to meet all conditions of roads and traffic, and to shield the driver's eye from the glare of the sun, headlights of approaching cars and street lights. The corner pieces 20 straddle the frame of the visor at the top corners thereof and serve as a reinforcement, making it almost impossible to break the visor glass by pushing it up from either corner. The clamps or bearing members 17 and the pivot studs 19 are adjustable relative to each other horizontally or in the direction of the length of the latter, which makes the device adjustable to windshields of different widths without changing the size of the visor frame. It will also be noted that the bracket arms 16 have a forward offset relative to the side bars 5 of the windshield frame to position their outer ends entirely clear of the adjusting wingnuts on the windshield which govern the upper glass panel of the windshield. The visor attachment also does not interfere with the putting up of side curtains. The visor can also be swung high enough to permit the upper glass panel of the windshield to be swung outwardly to horizontal position to enable the driver to get a clear view without looking through said panel or through the visor.

In the modified structure shown in Figures 5 and 6, the pivot studs 19 are on the outer ends of base bars 22 which are secured to the frame member 9 at the ends thereof, by screws 23. The bars 22 are longitudinally slotted, as shown at 24, to receive the screws 23, the purpose of the slots being to permit longitudinal adjustment to adapt the device to windshields of different widths.

In order that the visor may be readily adjusted at any desired angle with respect to the top windshield glass 6, and locked, there is provided a link connection 25 between each bracket arm 16 and the corresponding visor frame member 10. The link 25 is pivoted to the frame member 10, as shown at 26, and it has a sliding connection with the bracket arm 16, the latter having a longitudinal slot 27 carrying a pivot bolt 28 to which the link is connected, and by means of a wing nut 29 mounted on said bolt, the link can be locked to securely hold the parts in adjusted position.

The jaw members 13 and 14 in both structures can be made in different shapes to fit different kinds of windshield frames. The visor can be readily fitted to any ordinary windshield frame, and the structure is durable and simple, and requires no cutting or modification of the windshield frame.

I claim:

A visor for windshields comprising a glass panel, a frame carrying said panel, reinforcing members secured to and shaped to embrace the upper corners of said frame, elongated smooth surfaced pivot studs projecting laterally from said reinforcing members and integral therewith, brackets having means for securing the same to the side bars of a windshield and formed with upwardly and forwardly extending arms, bearings in the upper extremities of said arms formed to provide flexible gripping members, the length of said pivot studs being greater than the width of said bearings to provide for adjustment of said bearings relative to said studs to adapt said visor to shields of varying widths, and means to frictionally secure said pivot studs in said flexible bearings, whereby to maintain said visor at any desired position.

In testimony whereof I affix my signature.

JOHN WATTERSON DAVIS.